United States Patent [19]
Hess et al.

[11] Patent Number: 5,763,508
[45] Date of Patent: Jun. 9, 1998

[54] DISPERSION POWDERS AND METHOD OF PREPARATION AND USE THEREOF

[75] Inventors: Stefan Hess, Gross-Gerau; Michael Schottler, Bischofsheim; Ludwig Schmitz, Frankenthal, all of Germany

[73] Assignee: Clariant GmbH, Frankfurt, Germany

[21] Appl. No.: 697,345

[22] Filed: Aug. 22, 1996

[30] Foreign Application Priority Data

Sep. 2, 1995 [DE] Germany ............ 195 32 426.9

[51] Int. Cl.⁶ .................. C08K 3/00; C08K 5/10; C08K 3/26
[52] U.S. Cl. .................. 524/5; 524/315; 524/318; 524/425; 524/444; 524/442
[58] Field of Search .................. 524/5, 315, 318, 524/425, 442, 444

[56] References Cited

U.S. PATENT DOCUMENTS

| | | | |
|---|---|---|---|
| 4,157,998 | 6/1979 | Berntsson et al. | 260/42.13 |
| 4,434,257 | 2/1984 | Narisawa et al. | 524/5 |
| 5,192,366 | 3/1993 | Nishioka et al. | 524/5 |

FOREIGN PATENT DOCUMENTS

| | | | |
|---|---|---|---|
| 0 145 685 | 4/1988 | European Pat. Off. | |
| 0 601 518 | 6/1994 | European Pat. Off. | |
| 1 411 268 | 10/1975 | United Kingdom | |

OTHER PUBLICATIONS

Patent Abstracts of Japan, Pub. No. 06100344, Pub. Date. (Apr.) 1994.

Patent Abstracts of Japan, Pub. No. 61021137, Pub. Date. (Jan.) 1986.

E.W. Nägele, "Disperisionsbaustoffe", pp. 52–74.

*Primary Examiner*—Kriellion S. Morgan
*Attorney, Agent, or Firm*—Foley & Lardner

[57] ABSTRACT

Dispersion powders including (a) a polymer of vinyl ester, vinyl ester/ethylene, (meth)acrylate or styrene/acrylate homo- and copolymers, (b) 1 to 25% by weight, based on the total weight of the polymer, of a protective colloid, (c) 0.1 to 10% by weight, based on the total weight of the polymer, of at least one saturated carboxylic acid ester of the formula $C_nH_{(2n+1)}COOC_mH_{(2m+1)}$ where n=5 to 22 and m=1 to 8, and (d) 0 to 20% by weight, based on the total weight of the polymer, of anticaking agent, are useful, for example, as modifying agents in mortar and concrete for increasing the flexural tensile strength, compressive strength, and/or adhesive strength thereof.

14 Claims, 1 Drawing Sheet

DISPERSION POWDERS AND METHOD OF PREPARATION AND USE THEREOF

BACKGROUND OF THE INVENTION

1. Field of the Invention

The present invention relates to dispersion powders which comprise saturated carboxylic acid esters, processes for their preparation, and their use, for example, in building materials of low air pore content.

2. Description of Detailed Art

It has been known for quite a long time that polymer-modified mortars and concretes show a significantly improved profile of properties, in contrast to non-modified mortars and concretes. An increased flexural tensile strength and compressive strength may be mentioned in particular here, the increased compressive strength being attributable to a reduction in the water/cement value caused by the polymer modification. Furthermore, polymer-modified mortars and concretes have an improved tensile bond strength. Polymer modification in small amounts moreover improves the frost-thaw resistance of the modified mortar or concrete due to a reduced uptake of water. A detailed description of the properties mentioned above is found, for example, in the publication "Dispersionsbaustoffe"[Dispersion building materials] by E. W. Nägele. The polymer is added to mortar or concrete either in dispersion form in the case of two-component systems or in powder form in the case of one-component systems.

However, the fact that an increased introduction of air into the mortar takes place due to the modification is a disadvantage of correspondingly polymer-modified mortars and concretes. The air content in the polymer-modified mortar can be up to 20% higher than in the non-modified mortar in these cases. The uptake of air in the mortar is associated with adverse effects on the above mentioned properties. Thus, the flexural tensile strength, compressive strength and adhesive strength decrease noticeably with an increasing air content. The uptake of water is furthermore increased by the increased capillary absorbency, and in the end the frost-thaw resistance is thus made worse.

To keep the air content low, special defoamers must therefore be added to the mortar mixture. Silicon-, oil- or hydrocarbon-based defoamers have proved to be particularly suitable for hydraulically setting systems. As a rule, liquid defoamers are added to the dispersion in the case of two-component systems. Powder-based defoamers which are added to the dry mortar mixture are available for one-component systems.

However, if the defoamer is to be already present in the dispersion powder, a problem which frequently arises is that, after spray drying of the dispersion, the known defoamers to be added to the dispersion show only a severely reduced defoamer action, if any, in the redispersion then prepared from the dispersion powder.

The Offenlegungsschrift DE-A 21 64 256 describes esters of saturated, branched, mono- or polyunsaturated fatty acids and alcohols as additives for plasticizing synthetic resin dispersions. By addition of these additives, a very dense polymer film is obtained during film formation. The additive diffuses completely into the synthetic resin latex and acts there exclusively as a plasticizer, so that the use of special defoamers is additionally necessary.

European Patent EP-B 0 145 685 recommends the incorporation of stearyl methacrylate as a comonomer into synthetic resin dispersions for hydrophobicizing mortar compositions and concrete compositions. An advantage over other synthetic resin dispersions which is emphasized here is that an improvement in the reproducibility of the capillary structure and air pore structure is achieved by the addition of the synthetic resin dispersion according to the patent compared with low molecular weight additives. However, covalent bonding of the long-chain alkyl groups does not necessarily lead to a reduction in the air content here.

SUMMARY OF THE INVENTION

An object of the present invention was therefore to provide a dispersion powder which displays a defoaming action after preparation of a redispersion in mortar mixtures or concrete mixtures, and additionally reduces the air content in these mortar or concrete mixtures.

It is also an object of the invention to provide methods of preparing such dispersion powders and methods of using such powder.

In accordance with these objectives, there is provided according to the present invention a dispersion powder including (a) a polymer selected from the group consisting of vinyl esters, vinyl ester/ethylenes, (meth)acrylates and styrene/acrylate polymers, (b) 1 to 25% by weight, based on the total weight of the polymer (a), of a protective colloid, (c) 0.1 to 10% by weight, based on the total weight of the polymer (a), of at least one saturated carboxylic acid ester of the formula $C_nH_{(2n+1)}COOC_mH_{(2m+1)}$ where n=5 to 22 and m=1 to 8, and (d) 0 to 20% by weight, based on the total weight of the polymer (a), of anticaking agent.

There is also provided according to the present invention, a process for the preparation of such a dispersion powder including mixing a dispersion of polymer (a) and protective colloid (b) with the carboxylic acid ester (c) and, optionally, additional protective colloid (b), and subsequent drying the resulting mixture, optionally with simultaneous admixing of the anticaking agent (d).

There is also provided according to the invention mortar or concrete including a dispersion powder as discussed above.

Further objects, features, and advantages of the invention will become apparent from the detailed description of preferred embodiments that follows.

DETAILED DESCRIPTION OF PREFERRED EMBODIMENTS

Figure 1:
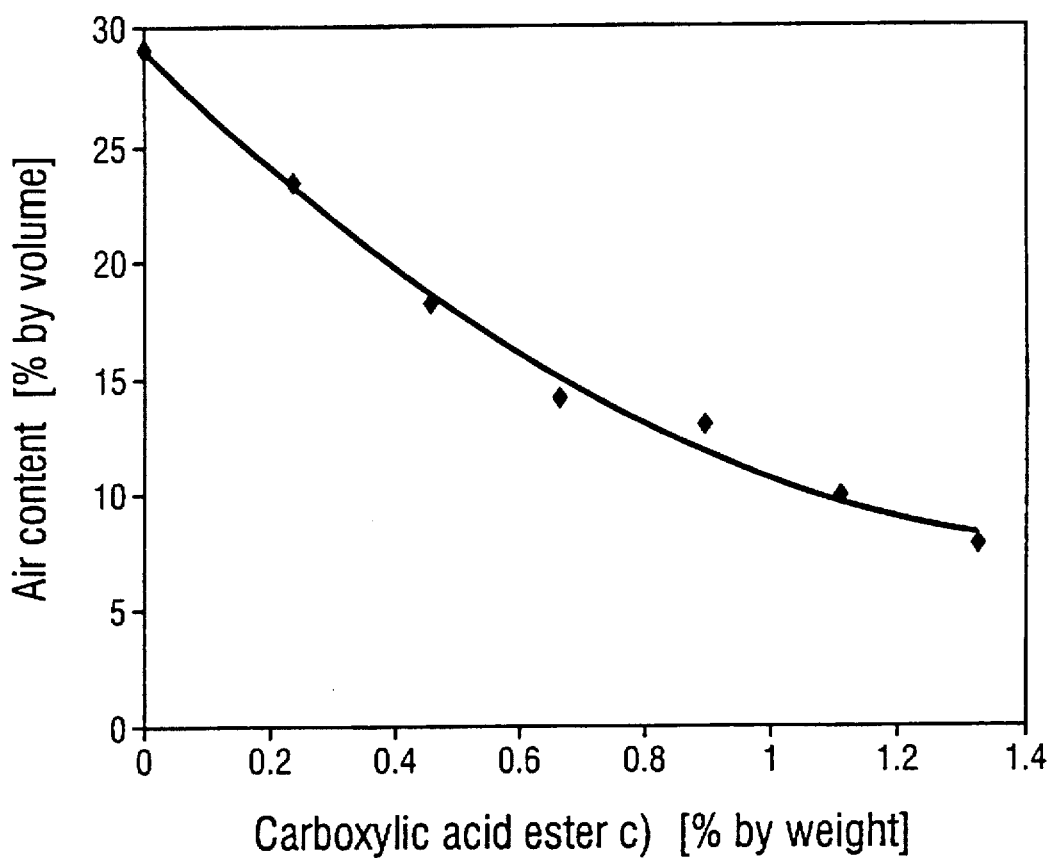
FIG. 1 shows the dependence of air content in fresh mortar on the amount of carboxylic and ester defoamer in the dispersion powders of the present invention.

The present invention relates to processing homo- or copolymeric vinyl ester or (meth)acrylate dispersions stabilized by protective colloids with saturated carboxylic acid esters of the formula $C_nH_{(2n+1)}COOC_mH_{(2m+1)}$ where n=5 to 22 and m=1 to 8, to give dispersion powders.

In particular, the invention relates to a dispersion powder comprising (a) a polymer from the group of vinyl ester, vinyl ester/ethylene, (meth)acrylate, and styrene/acrylate homo- and copolymers, (b) 1 to 25% by weight, preferably 3 to 12% by weight, based on the total weight of the polymer (a), of a protective colloid, (c) 0.1 to 10% by weight, preferably 0.5 to 3% by weight, based on the total weight of the polymer (a), of at least one saturated carboxylic acid ester of the formula $C_nH_{(2n+1)}COOC_mH_{(2m+1)}$ where n=5 to 22 and m=1 to 8, and (d) 0 to 20% by weight, preferably 1 to 15% by weight, based on the total weight of the polymer, of anticaking agent.

Any polymer or mixture of polymers formed from vinyl esters, acrylates, and/or methacrylates can be used as (a). Useful polymers include homopolymers of a vinyl ester, such as a homopolymer of vinyl acetate, vinyl propionate, and the like. Copolymers of a vinyl ester with another vinyl ester are also useful. Also, co- or terpolymers of a vinyl ester with an olefin such as ethylene and/or with one or more acrylates and/or with another vinyl ester are useful. Also, homopolymers of acrylates and copolymers of two or more acrylates are useful. Also, the acrylate can be polymerized with, for example, styrene. The use of the term copolymer, encompass terpolymers or higher polymers.

Suitable vinyl ester polymers for (a) include vinyl acetate homopolymers or copolymers of vinyl acetate with ethylene and/or other vinyl esters, such as vinyl propionate, vinyl pivalate, vinyl esters of Versatic® Acid 9, 10 or 11 (Shell-Chemie, α,α-dialkyl-branched carboxylic acids) and vinyl 2-ethylhexanoate, and/or with esters of acrylic acid and/or methacrylic acid with straight-chain, branched or cyclic alcohols having 1 to 22 carbon atoms, in particular 1 to 12 carbon atoms.

Suitable (meth)acrylate and styrene/(meth)acrylate polymers (a) include polymers of styrene and/or esters of acrylic acid and/or methacrylic acid with straight-chain, branched or cyclic aliphatic alcohols having 1 to 22 carbon atoms, in particular 1 to 12 carbon atoms.

Any desired protective colloid can be used as the protective colloid b), such as, for example, cellulose ether, water-soluble starch, polyvinylpyrrolidone and polycarboxylic acid. Polyvinyl alcohol is preferably employed. The degree of polymerization of the polyvinyl alcohol is preferably 200 to 3500, in particular between 500 and 3000. The degree of hydrolysis is preferably 80 to 98 mol %, in particular 85 to 95 mol %.

Any carboxylic acid esters falling within the above formula can be used as (c). Mixtures of esters are also useful. Examples of carboxylic acid esters (c) of the formula $C_nH_{(2n+1)}COOC_mH_{(2m+1)}$ which are preferably employed are those where n=11 to 19 and m=2 to 6, in particular, n-butyl stearate, i-butyl stearate, n-butyl palmitate, i-propyl palmitate, ethyl palmitate i-propyl myristate, ethyl myristate, and n-butyl laurate.

Any anticake agents known in the art can be used. Suitable anticaking agents (d) are preferably aluminum silicates, calcium carbonates, or silicic acids and, in particular, basic intergrowths of talc and dolomite. The anticaking agents preferably have a particle size of 0.001 to 0.5 mm.

If desired, the dispersion powder may comprise further additives such as cement liquefiers, such as melamine-formaldehyde condensates, wetting agents, such as alkyl polyglycols, plasticizers, such as dibutyl phthalate, or dispersion defoamers, such as polyethersiloxanes.

The present invention furthermore relates to a process for the preparation of the dispersion powder as described above by mixing a dispersion of polymer (a) and protective colloid (b) with the carboxylic acid ester (c) and, optionally, further (b), and subsequent drying of the resulting mixture, if appropriate with simultaneous admixing of the anticaking agent (d).

The polymer (a) may be prepared by generally known methods, preferably by emulsion polymerization of the corresponding monomers by means of a free radical initiator.

The corresponding dispersion powders are preferably prepared by spray drying the dispersion of the polymer (a) in a spraying tower. Spraying may be carried out in a known manner, for example, with a two-component nozzle or a rotary disk at a temperature of the dry gas of between 100° and 180° C. To increase the storage stability and the free-flowing properties of the dispersion powder, an anticaking agent (d) is preferably introduced into the spraying tower in parallel with the dispersion, so that preferential deposition of the anticaking agent on the dispersion particles occurs. Readily redispersible dispersion powders which are particularly suitable for use in mortars and concretes are obtained in the present invention.

The invention also relates to the use of the dispersion powders according to the invention for modifying mortar or concrete. By addition of the dispersion powders according to the invention to mortar or concrete, the flexural tensile strength, compressive strength and adhesive strength of the set building material is increased, and at the same time the air content in the mortar or concrete is adjusted in a controlled manner.

The invention is further illustrated by the following non-limiting examples.

EXAMPLES

The parts and percentages listed in the examples relate to the weight, unless noted otherwise.

Dispersion 1

Vinyl acetate/ethylene copolymer dispersion stabilized with polyvinyl alcohol and having a solids content of about 54%.

Dispersion 2

Vinyl acetate/vinyl Versatate copolymer dispersion (vinyl Versatate, for example VeoVa10® (Shell-Chemie)) stabilized with polyvinyl alcohol and having a solids content of about 50%.

Dispersion 3

Vinyl acetate/vinyl Versatate/butyl acrylate terpolymer dispersion (vinyl Versatate, for example VeoVa10) stabilized with polyvinyl alcohol and having a solids content of about 43%.

Dispersion 4

Methyl methacrylate/butyl acrylate copolymer dispersion stabilized with polyvinyl alcohol and having a solids content of about 46%.

Spraying aid

Polyvinyl alcohol having a degree of hydrolysis of 88 mol % and a Höppler viscosity in 4% strength aqueous solution of 4 mpa.s (in accordance with DIN 53015).

Example 1

11.6 g of polyvinyl alcohol in 60 g of water and 5.5 g of i-butyl stearate are admixed with 1000 g of dispersion 1. A spray viscosity of about 400 mPa.s (Haake method, at $D=17.93\ s^{-1}$) is then established by addition of water. The mixture is sprayed with the aid of a two-component nozzle. During spraying, an anti-blocking (anticaking) agent (basic antiblocking agent, intergrowth of talc and dolomite) is metered in such that the percent by weight content of the antiblocking agent in the dispersion powder is 11%. A storage-stable, readily free-flowing powder is obtained.

Example 2

The procedure is analogous to Example 1, but instead of 5.5 g of i-butyl stearate, 5.5 g of n-butyl stearate are employed.

Examples 3–8

The procedure is analogous to Example 1, but instead of 5.5 g of i-butyl stearate, 1.4 g (Example 3), 2.8 g (Example 4), 4.1 g (Example 5), 5.5 g (Example 6), 6.9 g (Example 7) or 8.2 g (Example 8) of a 1:1 mixture of nbutyl stearate and n-butyl palmitate are employed.

Example 9

The procedure is analogous to Example 1, but instead of 5.5 g of i-butyl stearate, 5.5 g of ethyl palpitate are employed.

Example 10

The procedure is analogous to Example 1, but instead of 5.5 g of i-butyl stearate, 5.5 g of ethyl myristate are employed.

Comparison Example 1

The procedure is analogous to Example 1, but no i-butyl stearate is added.

Example 11

12 g of polyvinyl alcohol in 60 g of water and 5.12 g of a 1:1 mixture of i-butyl stearate and n-butyl palmitate are admixed to 1000 g of dispersion 2. A spray viscosity of about 400 mPa.s (Haake method, at D=17.93 s$^{-1}$) is then established by addition of water. The mixture is sprayed with the aid of a two-component nozzle. During spraying, an anti-blocking agent (basic anti-blocking agent, intergrowth of talc and dolomite) is metered in such that the content of the antiblocking agent in the dispersion powder is 11%. A storage-stable, readily free-flowing powder is obtained.

Example 12

The procedure is analogous to Example 11, but instead of 5.12 g of a 1:1 mixture of i-butyl stearate and n-butyl palmitate, 5.12 g of i-propyl myristate are employed.

Comparison Example 2

The procedure is analogous to Example 11, but no 1:1 mixture of i-butyl stearate and n-butyl palmitate is added.

Example 13

10.75 g of polyvinyl alcohol in 60 g of water and 4.4 g of i-propyl palmitate are admixed to 1000 g of dispersion 3. A spray viscosity of about 400 mPa.s (Haake method, at D=17.93 s$^{-1}$) is then established by addition of water. The mixture is sprayed with the aid of a two-component nozzle. During spraying, an anti-blocking agent (basic antiblocking agent, intergrowth of talc and dolomite) is metered in such that the percent by weight content of the antiblocking agent in the dispersion powder is 11%. A storage-stable, readily free-flowing powder is obtained.

Example 14

The procedure is analogous to Example 13, but instead of 4.4 g of i-propyl palmitate, 4.4 g of n-butyl laurate are employed.

Comparison Example 3

The procedure is analogous to Example 13, but 4.4 g of i-propyl palmitate are not added.

Example 15

23 g of polyvinyl alcohol in 80 g of water and 4.8 g of a 1:1 mixture of i-propyl palmitate and n-butyl laurate are admixed to 1000 g of dispersion 4. A spray viscosity of about 400 mpa.s (Haake method, at D=17.93 s$^{-1}$) is then established by addition of water. The mixture is sprayed with the aid of a two-component nozzle. During spraying, an anti-blocking agent (basic antiblocking agent, intergrowth of talc and dolomite) is metered in such that the content of the antiblocking agent in the dispersion powder is 15%. A storage-stable, readily free-flowing powder is obtained.

Example 16

The procedure is analogous to Example 15, but instead of 4.8 g of a 1:1 mixture of i-propyl palmitate and n-butyl laurate, 4.8 g of a 1:1 mixture of i-propyl myristate and ethyl palmitate are employed.

Comparison Example 4

The procedure is analogous to Example 15, but no 1:1 mixture of i-propyl palmitate and n-butyl laurate is added.
Performance testing The air content is determined in accordance with DIN 18555 Part 2.

For this, 1000 g of standard sand II, 500 g of standard sand I, 500 g of cement CEM I 32.5 R and 50 g of dispersion powder are weighed out and premixed in the dried state.

250 g of water are then initially introduced into a mixer as described in DIN EN 196 Part 1. The dry mixture is added uniformly and rapidly in accordance with DIN EN 196 Part 1, at a stirring speed of 140 revolutions/minute. Thereafter, the mixture is stirred at 140 revolutions/minute for 1 minute, at 285 revolutions/minute for 1 minute and again at 140 revolutions/minute for 1 minute.

The air content of the fresh mortar is measured by the pressure compensation method using an adjusted test apparatus of 1 dm$^3$ capacity. The test apparatus has a pressure chamber in which a defined pressure is generated. By opening an overflow valve, pressure compensation with the sample container filled with fresh mortar is established. To determine the air content, the test apparatus is filled with the mortar mixture. The upper part of the apparatus is placed on the cleaned ground edge of the container and the apparatus is closed. The volume of the apparatus which is still free is filled with water. The chamber is brought to the prescribed pressure. After pressure compensation has taken place, the air content is determined. The volume content of the air is stated in %, the error tolerance being about 1%.

| Dispersion powder | % by weight of carboxylic acid ester c)* | Air content [%] |
|---|---|---|
| Comparison Example 1 | 0 | 29.0 |
| Example 1 | 0.89 | 11.9 |
| Example 2 | 0.89 | 10.4 |
| Example 3 | 0.23 | 23.4 |
| Example 4 | 0.45 | 18.3 |
| Example 5 | 0.66 | 14.3 |
| Example 6 | 0.89 | 13.1 |
| Example 7 | 1.11 | 10.0 |
| Example 8 | 1.32 | 8.0 |
| Example 9 | 0.89 | 15.0 |
| Example 10 | 0.89 | 17.6 |
| Comparison Example 2 | 0 | 27.9 |
| Example 11 | 0.89 | 21.5 |

-continued

| Dispersion powder | % by weight of carboxylic acid ester c)* | Air content [%] |
|---|---|---|
| Example 12 | 0.89 | 11.8 |
| Comparison Example 3 | 0 | 23.4 |
| Example 13 | 0.89 | 10.2 |
| Example 14 | 0.89 | 18.1 |
| Comparison Example 4 | 0 | 26.3 |
| Example 15 | 0.89 | 14.1 |
| Example 16 | 0.89 | 12.3 |

*Relative to the total weight of the dispersion powder

FIG. 1 (FIG. 1) shows the dependence of the air content in the fresh mortar according to Examples 3 to 8 and Comparison Example 1 on the amount of the carboxylic acid ester c), based on the total amount of the dispersion powder. The air content can advantageously be adjusted as desired over a wide range with the aid of the modified dispersion powder according to the invention.

German Application 195 32 426.9 filed Sep. 2, 1995 (the priority document of the present application) is hereby incorporated by reference in its entirety.

Other embodiments of the invention will be apparent to those skilled in the art from consideration of the specification and practice of the invention disclosed herein. It is intended that the specification be considered as exemplary only, with the true scope and spirit of the invention being indicated by the following claims.

What is claimed is:

1. A dispersion powder comprising
   (a) a polymer selected from the group consisting of vinyl ester polymers, vinyl ester/ethylene polymers, (meth) acrylate polymers, and styrene/acrylate polymers,
   (b) 1 to 25% by weight, based on the total weight of the polymer (a), of a protective colloid,
   (c) 0.1 to 10% by weight, based on the total weight of the polymer (a), of at least one saturated carboxylic acid ester of the formula $C_nH_{(2n+1)}COOC_mH_{(2m+1)}$ where n=5 to 22 and m=1 to 8, and
   (d) 0 to 20% by weight, based on the total weight of the polymer (a), of anticaking agent.

2. A dispersion powder as claimed in claim 1, wherein the polymer (a) comprises a vinyl acetate copolymer.

3. A dispersion powder as claimed in claim 1, wherein the protective colloid (b) comprises a polyvinyl alcohol having a degree of polymerization of 200 to 3500 and a degree of hydrolysis of 80 to 98 mol %.

4. A dispersion powder as claimed in claim 1, wherein the carboxylic acid ester (c) satisfies the formula $C_nH_{(2n+1)}COOC_mH_{(2m+1)}$ where n=11 to 19 and m=2 to 6.

5. A dispersion powder as claimed in claim 1, which comprises 1 to 15% by weight, based on the total weight of the polymer (a), of anticaking agent.

6. A dispersion powder as claimed in claim 1, wherein the anticaking agent is present and comprises a basic intergrowth of talc and dolomite.

7. A process for the preparation of a dispersion powder as claimed in claim 1, comprising mixing a dispersion of polymer (a) and protective colloid (b) with the carboxylic acid ester (c) and, optionally, then with additional protective colloid (b), and then drying the resulting mixture, optionally with simultaneous admixing of the anticaking agent (d).

8. A process as claimed in claim 7, wherein drying is carried out by spray drying in a drying tower.

9. Mortar or concrete comprising a dispersion powder as claimed in claim 1.

10. A method for increasing the flexural tensile strength, compressive strength, or adhesive strength, of mortar or concrete, comprising adding a dispersion powder as claimed in claim 1 to the mortar or concrete.

11. An aqueous dispersion comprising a dispersion powder as claimed in claim 1.

12. A dispersion powder as claimed in claim 1, comprising, based on the total weight of (a), 3 to 12% by weight of (b), 0.5 to 3% by weight of (c), and 0 to 20% by weight of (d).

13. A dispersion powder as claimed in claim 1, wherein the carboxylic acid ester (c) is selected from the group consisting of n-butyl stearate, i-butyl stearate, n-butyl palmitate, i-propyl palmitate, ethyl palmitate i-propyl myristate, ethyl myristate, and n-butyl laurate.

14. A dispersion powder as claimed in claim 1, wherein an anticaking agent is present that is selected from the group consisting of aluminum silicates, calcium carbonates, and silicic acids.

* * * * *